W. PETERSON.
COMB.
APPLICATION FILED MAR. 9, 1920.
1,361,612.
Patented Dec. 7, 1920.
2 SHEETS—SHEET 1.
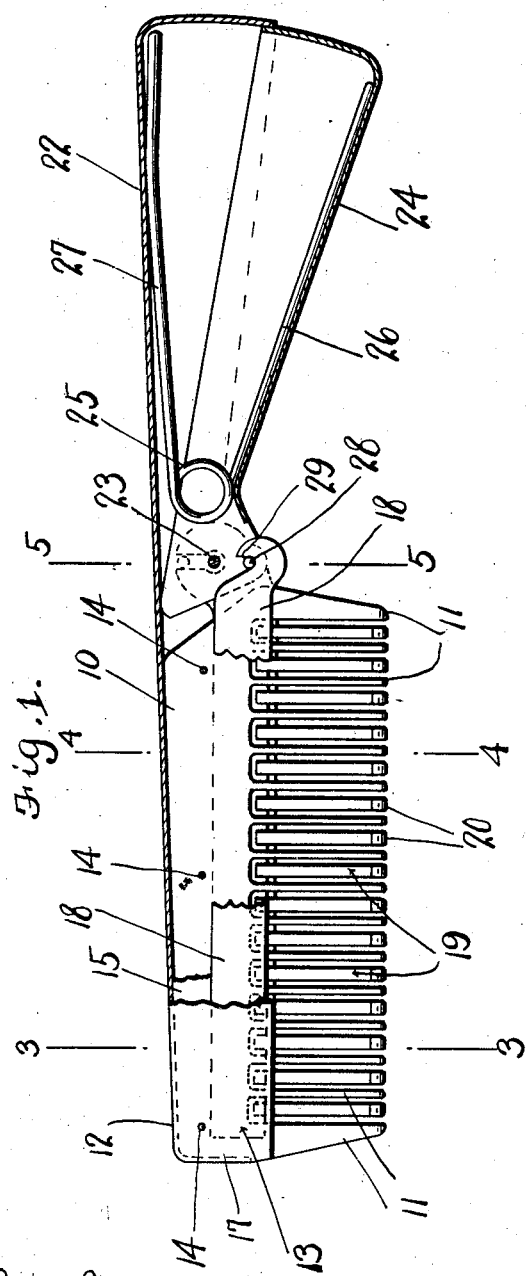
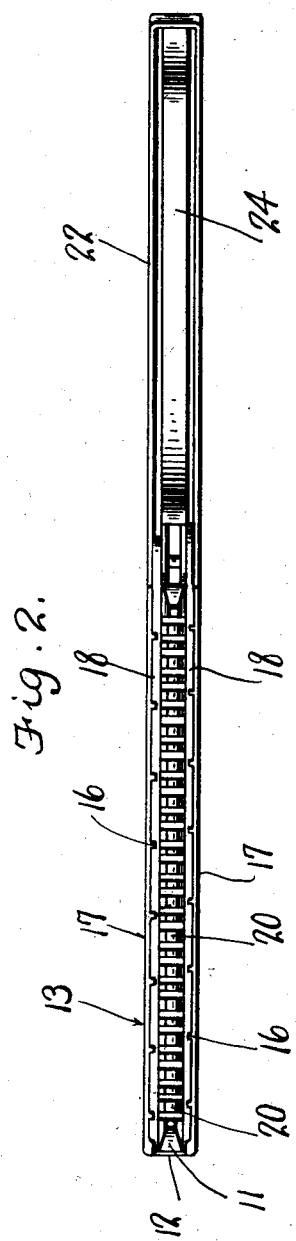
W. Peterson
INVENTOR
BY *Victor J. Evans*
ATTORNEY
WITNESS:

W. PETERSON.
COMB.
APPLICATION FILED MAR. 9, 1920.
1,361,612.
Patented Dec. 7, 1920.
2 SHEETS—SHEET 2.
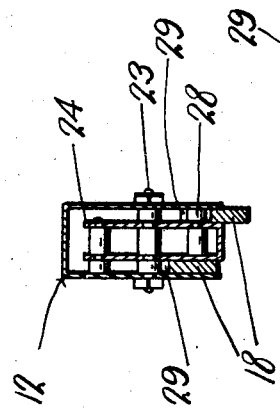
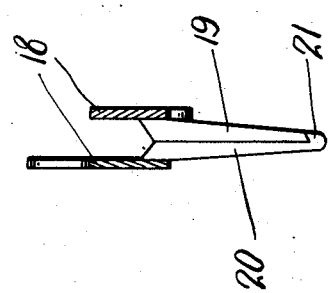
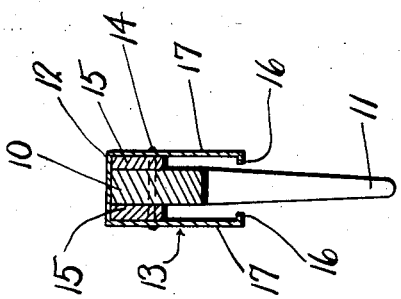
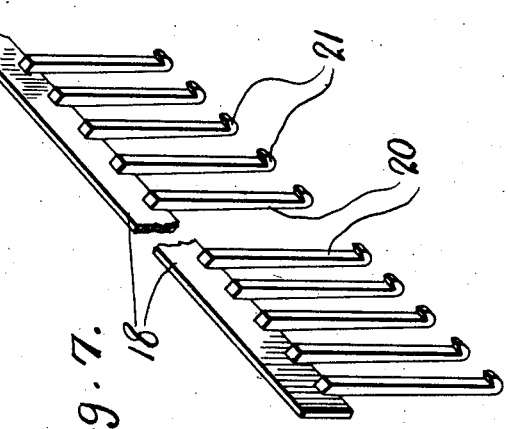
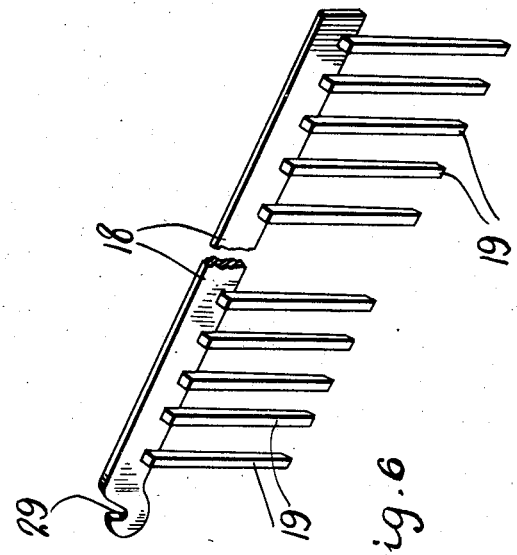
W. Peterson
INVENTOR

UNITED STATES PATENT OFFICE.

WILLIE PETERSON, OF NEWARK, NEW JERSEY.

COMB.

1,361,612.         Specification of Letters Patent.         Patented Dec. 7, 1920.

Application filed March 9, 1920. Serial No. 364,484.

*To all whom it may concern:*

Be it known that I, WILLIE PETERSON, a citizen of the United States, residing at Newark, in the county of Essex and State of New Jersey, have invented new and useful Improvements in Combs, of which the following is a specification.

This invention relates to combs and has for an object the provision of a comb, by means of which curls or kinks may be removed from the human hair.

Another object is the provision of a comb which when heated and run through the hair, will subject the latter to a pressing action to straighten out and remove the kinks, the teeth of the comb being movable to regulate the space therebetween so that just the right pressure may be obtained to pull the comb through the hair and at the same time to subject the latter to a pressing action.

Another object of the invention is the provision of a comb, in which the teeth are adjustable from the handle, so that when moving the comb through the hair, the pressure may be regulated as required.

With the above and other objects in view the invention further includes the following novel features and details of construction, to be hereinafter more fully described, illustrated in the accompanying drawings, and pointed out in the claims hereunto appended.

In the drawings:—

Figure 1 is a side elevation of a comb embodying the present invention, part being broken away.

Fig. 2 is a bottom plan view of the comb.

Fig. 3 is a transverse section on the line 3—3 of Fig. 1.

Fig. 4 is a similar view on the line 4—4 of Fig. 1.

Fig. 5 is a like view on the line 5—5 of Fig. 1.

Fig. 6 is a detail perspective view of the front set of movable teeth.

Fig. 7 is a similar view of the rear set of movable teeth.

Referring to the drawings in detail wherein like characters of reference denote the corresponding parts, the comb is illustrated as including a back 10, from which extend a plurality of spaced teeth 11, the space between these teeth being relatively wide for a purpose hereinafter apparent. The back 10 and the teeth 11 are preferably formed integral, but secured over this back is a casing or housing 12, which extends downwardly upon each side of the back and for a short distance upon each side of the teeth 11, so as to provide side plates 13. Fastening devices 14 extend through the plates 13 and the back 10, the plates being spaced from the back through the medium of spacing members 15 through which the fastening devices 14 also extend. The free edges of the plates 13 are turned inwardly as indicated at 16 so as to provide guides 17 upon opposite sides of the comb back.

Operating within each of the guides 17, is a bar 18, the latter extending longitudinally of the comb and having extending downwardly and inwardly therefrom teeth which occupy the spaces between the teeth 11. The teeth carried by the bars 18 will be hereinafter referred to as front teeth 19 and rear teeth 20, each of which is secured to one of the bars 18. The teeth 19 and 20 are normally in transverse alinement, so as to provide spaces between these teeth and the adjacent teeth 11 for the passage of the hair. The front teeth 19 are slightly shorter in length than the rear teeth 20 and the latter have extending from their lower ends a forward projection 21, whose upper edge is inclined as shown in Fig. 4, to provide a seat or guide for the lower end of the front tooth 19, so that when the teeth 19 and 20 are in transverse alinement, they are in effect, a single tooth.

The casing or housing 12 extends beyond one end of the comb to provide a handle 22 and pivotally mounted within this handle as indicated at 23, is a lever 24. This lever is hollow and seated therein is a spring 25, one leg 26 of which bears against the lever 24 and the other leg 27 against the underside of the handle 22. Each of the bars 18 likewise extends beyond the end of the comb for connection with the lever 24 and for this purpose, this said lever is provided upon opposite sides above and below the pivot 23 with a stud or pins 28, which project laterally from the lever. The studs or pins 28 engage notch 29 formed in the extensions of the bars 18, one of these notches extending inwardly a sufficient distance to receive the pivot 23, while the other notch receives the other pin 28.

In the use of the invention, the comb is heated and grasped by the handle and run through the hair and by exerting the right amount of pressure upon the lever 24, the proper degree of pressing action may be obtained through the teeth, the teeth 19 and 20 moving in opposite directions to restrict the space between their opposite edges and the adjacent edges of the stationary teeth.

The invention is susceptible of various changes in its form, proportions and minor details of construction, and the right is herein reserved to make such changes as properly fall within the scope of the appended claims.

Having described the invention what is claimed is:

1. A comb comprising a back, spaced stationary teeth carried thereby, pairs of movable teeth located between the stationary teeth and means secured to the teeth of each pair of movable teeth for simultaneously moving them longitudinally of the comb in opposite directions.

2. A comb comprising a back, spaced stationary teeth carried thereby, normally transversely alined movable teeth located between the stationary teeth and means including a spring actuated lever connected to the movable teeth for separating the same and moving them longitudinally of the comb.

3. A comb comprising a back, spaced stationary teeth carried thereby, a housing included in said back and extending down upon opposite sides of the stationary teeth, a handle formed by an extension of the housing, movable teeth located between the stationary teeth and means including a spring actuated lever connected to the movable teeth and pivotally mounted in the handle for moving the teeth longitudinally of the comb.

4. A comb comprising a back, spaced stationary teeth carried thereby, a pair of transversely alined movable teeth positioned between the stationary teeth, a pivotally mounted spring actuated lever and means connecting the transversely alined teeth and lever for moving the former in opposite directions.

5. A comb comprising a back, spaced stationary teeth carried thereby, a movable bar extending longitudinally upon each side of the comb, a plurality of teeth carried by each of said bars, said teeth extending inwardly between each of the stationary teeth, a pivotally mounted operating lever and means connecting the bar carried teeth and lever for moving the former longitudinally in opposite directions between the stationary teeth.

6. A comb comprising a back, spaced stationary teeth carried thereby, a bar extending longitudinally upon each side of the comb, a plurality of teeth carried by each of said bars, said teeth extending inwardly between each of the stationary teeth, a pivotally mounted operating lever and an arm extending from each of said bars and located upon opposite sides of the pivots of the operating lever for moving the bars longitudinally of the comb in opposite directions.

In testimony whereof I affix my signature.

WILLIE PETERSON.